Patented Aug. 3, 1948

2,446,408

UNITED STATES PATENT OFFICE 2,446,408

PREPARATION OF ANHYDROUS ETHER

William K. Buchanan, Edinburgh, Scotland, and William Simpson, Manchester, England, assignors, by mesne assignments, to General Electric Company, a corporation of New York No Drawing. Application August 21, 1946, Serial No. 692,148. In Great Britain February 25, 1946

6 Claims. (Cl. 260—616)

This invention relates to the preparation of anhydrous ethers employed, e. g., in the Grignard reaction and in certain commercial processes for the production of organo-substituted halogenosilanes. More particularly, the invention is concerned with a method for the preparation of anhydrous ether, for example, anhydrous diethyl ether, from hydrous ether, which method comprises adding a silicon tetrahalide, for instance, silicon tetrachloride, to the hydrous ether in at least sufficient quantity to combine with all the water present thereby to cause the formation of insoluble silicic or orthosilicic acid [$Si(OH)_4$ or $H_4SiO_4$] or polymers of orthosilicic acid, which may be removed from the anhydrous ether by filtration.

One of the methods of preparing organo-substituted halogenosilanes, for example, hydrocarbon-substituted halogenosilanes (which have utility as intermediates in the preparation of organo-substituted polysiloxanes), comprises effecting reaction between a silicon tetrahalide, for example, silicon tetrachloride, and an organo-substituted magnesium halide, preferably a hydrocarbon-substituted magnesium bromide, in the presence of anhydrous diethyl ether. The ether solution of the organo-substituted magnesium halide, e. g., alkyl, aryl, aralkyl, etc., magnesium halides, is usually prepared by effecting reaction in an anhydrous ether medium, between magnesium, said magnesium being in the form of, e. g., turnings, with an organic halide, preferably an organic bromide, e. g., a hydrocarbon bromide, for instance, ethyl bromide. This latter reaction is often advantageously initiated by the addition to the reaction mixture of, for example, a crystal of iodine.

In order that the above reaction between the magnesium and the organic halide and the latter reaction (for the preparation of organo-substituted halogenosilanes) between the organo-substituted magnesium halide and the silicon tetrahalide take place, it is necessary that the ether employed as the reaction mediums in these reactions be substantially anhydrous. Present-day methods for drying ether include, for example, drying the ether first with lime, thereafter with sodium wire, and finally distilling the ether under substantially anhydrous conditions. We have now found that anhydrous ethers can be prepared more easily and economically by adding a silicon tetrahalide, for example, silicon tetrachloride, to the hydrous or "wet" ether in an amount at least sufficient to react with all the water present in the ether. By means of this reaction, the silicon tetrahalide is converted to the solid orthosilicic acid (monomeric or polymeric form) which comes down as an insoluble precipitate from the ether. The orthosilicic acid thus formed may be removed from the ether by decanting or filtering of the substantially anhydrous ether from the precipitate. Even though an excess (over the amount required to react with all the water) of the silicon tetrahalide is employed in the preparation of the anhydrous ether, the excess of the silicon tetrahalide is not detrimental if the organomagnesium halide is to be reacted later with the silicon tetrahalide in the preparation of the organo-substituted halogenosilanes.

In order that those skilled in the art may better understand how the present invention may be practiced, the following examples are given by way of illustration and not by way of limitation.

Example 1

Two cc. silicon tetrachloride were added to 140 cc. diethyl ether (analytical reagent) which had been shaken with water at 20° C. and so was saturated with the water. A fairly heavy white precipitate was formed which was filtered off and the ether used as a solvent for the preparation of ethyl magnesium bromide by the following method: 4 grams magnesium metal turnings and 135 cc. ether treated as above, were placed in a flask fitted with a stirrer, condenser and separatory funnel. 18.5 grams of pure ethyl bromide were placed in a separatory funnel and a small amount of the ethyl bromide was run into the reaction vessel. When the Grignard reaction started, either spontaneously or on addition of a crystal of iodine, the stirrer was started and the remainder of the ethyl bromide slowly added. Stirring was continued until the reaction ceased and thereafter the ethereal solution of ethyl magnesium bromide was filtered. No difficulty was encountered in starting the Grignard preparation. Ether treated as above was as efficient as ether which had been dried over lime and sodium and then distilled. No reaction between the magnesium metal turnings and pure ethyl bromide was obtained when an attempt was made to effect reaction between these ingredients in the presence of "wet" or hydrous ether.

Example 2

Two cc. silicon tetrachloride were added to 280 cc. of moisture-containing diethyl ether (analytical reagent). Upon addition of silicon tetrachloride a suspension of the orthosilicic acid in the ether resulted. When this ether containing the suspended orthosilicic acid was used in the Grignard preparation as in Example 1, a reaction started easily upon the mere addition of a small crystal of iodine. Ordinary commercial grade diethyl ether can not be used in the Grignard reaction if the ether is not dried previously.

*Example 3*

When 1 cc. silicon tetrachloride was added to the same analytical grade diethyl ether used in Example 2, the resultant ethereal suspension was successfully used in the Grignard preparation as illustrated in Example 1.

*Example 4*

About 2 cc. silicon tetrachloride were added to about 200 cc. commercial, that is hydrous methylated ether (an ethyl ether made from methanol-denatured ethanol). The white precipitate which formed was allowed to settle and the ether was decanted and successfully used as a solvent in the Grignard reaction as illustrated in Example 1.

About 4 cc. silicon tetrachloride were added to a mixture of magnesium metal turnings and 280 cc. diethyl ether (analytical reagent) which had been saturated with water at 20° C. The amount of silicon tetrachloride added was in excess of that required to render the "wet" ether anhydrous. The resultant mixture was stirred rapidly, and pure ethyl bromide added slowly. It was found impossible to prepare ethyl magnesium bromide in this fashion, even on the addition of a crystal of iodine and the application of heat to the mixture. However, if the voluminous precipitate of orthosilicic acid were removed from the ether, the reaction could be effected without difficulty. This example illustrates the necessity for removing any heavy precipitate of orthosilicic acid in order to make the anhydrous ether suitable for the Grignard reaction. Slight suspensions need not be removed to use the anhydrous ether as a solvent successfully in the Grignard reaction as will be evident from the results obtained in Examples 2 and 3.

From the foregoing examples it will be apparent that "wet" or hydrous ether, for example, diethyl ether, methylated ether, etc., can be rendered substantially anhydrous and suitable for use as a solvent in the Grignard reaction in the preparation of Grignard reagents by the addition of a silicon tetrahalide, for example, silicon tetrachloride, in an amount at least equal to that required to remove all the water present in the ether in the form of orthosilicic acid or polymers of orthosilicic acid. The amount of the silicon tetrahalide added is preferably in excess of the amount required to react with all the water present to form orthosilicic acid or polymers thereof. Other silicon tetrahalides which may be employed include silicon tetrabromide, silicon tetrafluoride, etc.

Throughout this specification and claims, the white precipitate formed, or the white suspension, will be referred to as "orthosilicic acid" although it is probable that the polymeric form of orthosilicic acid is also present since the hydrogen halide released by the hydrolysis of the silicon tetrahalide probably causes polymerization of the orthosilicic acid to take place immediately.

As previously mentioned, if the Grignard reagent is to be used in the preparation of organo-substituted halogenosilanes, a slight excess of the silicon tetrahalide in the ether is of no consequence. However, by addition of the exact amount of the silicon tetrahalide required to remove the water from the ether and removal of the precipitated orthosilicic acid, it will be found that the ether will not be contaminated with organo-substituted halogenosilanes and can be used for any desired purpose where anhydrous ether is employed.

It will, of course, be understood by those skilled in the art that this invention is not limited to the specific ethers mentioned in the foregoing examples. Other ethers which may be rendered substantially anhydrous and capable of being used in the preparation of Grignard reagents include, for example, the relatively low-boiling (below 100° C.) lower alkyl ethers, for instance, methyl ethyl ether, dipropyl ether, methyl propyl ether, ethyl propyl ether, etc.

What we claim as new and desire to secure by Letters Patent of the United States is:

1. The method of removing water from a low-boiling lower alkyl ether containing the said water therein which comprises adding to the water-containing ether a silicon tetrahalide in an amount at least equal to that required to combine with all the water present in the ether to form orthosilicic acid.

2. The method of removing water from a low-boiling lower alkyl ether containing the said water therein, which method comprises adding silicon tetrachloride to the said water-containing ether in an amount at least equal to that required to combine with all the water to form orthosilicic acid.

3. The method of removing water from diethyl ether containing water therein which comprises adding to the said ether an amount of a silicon tetrahalide equal to at least that required to combine with all the water present in the ether to form orthosilicic acid.

4. The method of removing water from methylated ether containing water therein which comprises adding to the said ether an amount of a silicon tetrahalide equal to at least that required to combine with all the water present in the ether to form orthosilicic acid.

5. The method as in claim 3 wherein the orthosilicic acid is removed from the substantially dry ether.

6. The method as in claim 4 wherein the orthosilicic acid is removed from the substantially dry ether.

WILLIAM K. BUCHANAN.
WILLIAM SIMPSON.

REFERENCES CITED

The following references are of record in the file of this patent:

UNITED STATES PATENTS

| Number | Name | Date |
| --- | --- | --- |
| 1,442,520 | Buc | Jan. 16, 1923 |
| 1,466,435 | Hammond | Aug. 28, 1923 |
| 2,104,488 | Kennedy et al. | Jan. 4, 1938 |

OTHER REFERENCES

Baskerville et al., "Journal of Industrial and Engineering Chemistry," vol. 3, pages 301 to 316 (1911).

Richter, "Transactions of the American Electrochemical Society," vol. 35, pages 323 to 326 (1919).